US010169611B2

(12) United States Patent
Buddepalli et al.

(10) Patent No.: US 10,169,611 B2
(45) Date of Patent: Jan. 1, 2019

(54) DYNAMIC APPLICATION HIDING

(71) Applicant: International Business Machines Corporation, Armonk, NY (US)

(72) Inventors: Giridhar E. Buddepalli, Bangalore (IN); Anita Govindjee, Ithaca, NY (US); Jenny S. Li, Danbury, CT (US); Narayana Pattipati, Bangalore (IN); Lisa M. Salcedo Eichorn, Weston, FL (US); Ronald A. Soltis, Woodbury, CT (US); Catharina E. Wilner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 14/849,985

(22) Filed: Sep. 10, 2015

(65) Prior Publication Data

US 2017/0076100 A1    Mar. 16, 2017

(51) Int. Cl.
*G06F 21/62* (2013.01)

(52) U.S. Cl.
CPC ...... *G06F 21/629* (2013.01); *G06F 2221/032* (2013.01); *G06F 2221/2105* (2013.01)

(58) Field of Classification Search
CPC .............. G06F 21/629; G06F 21/6245; G06F 2221/2105; G06F 2221/032
See application file for complete search history.

(56) References Cited

U.S. PATENT DOCUMENTS

| | | | | |
|---|---|---|---|---|
| 5,859,639 A * | 1/1999 | Ebrahim | ............... | G06F 3/0481 715/788 |
| 8,369,899 B2 | 2/2013 | Hasegawa | | |
| 9,183,383 B1* | 11/2015 | Yablokov | ............... | G06F 21/51 |
| 2004/0267600 A1* | 12/2004 | Horvitz | ............. | G06F 17/30873 705/7.31 |
| 2007/0006316 A1* | 1/2007 | Veselova | ............. | G06F 21/6245 726/26 |
| 2007/0150827 A1* | 6/2007 | Singh | ...................... | G06F 3/011 715/773 |
| 2008/0168401 A1* | 7/2008 | Boule | ................... | G06F 3/04883 715/863 |
| 2010/0190531 A1* | 7/2010 | Hasegawa | ............... | G06F 21/32 455/566 |

(Continued)

OTHER PUBLICATIONS

Tofel, Kevin, C., "Chameleon: A must-see home screen for Android tablets", Gigamon, May 17, 2012, pp. 1-6, <https://gigaom.com/2012/05/17/chameleon-a-must-see-home-screen-for-android-tablets/>.

(Continued)

*Primary Examiner* — Joseph P Hirl
*Assistant Examiner* — J. Brant Murphy
(74) *Attorney, Agent, or Firm* — Gilbert Harmon, Jr.

(57) ABSTRACT

In an approach to enhancing the security features of user interfaces of computing devices, a computing device repeatedly detects environmental cues in its vicinity. The computing device determines the presence of a threat based on matching at least one of the detected environmental cues with one or more stored threat criteria. The computing device determines the presence of one or more sensitive applications on a user interface. Having determined the presence of one or more sensitive applications on the user interface, the computing device hides the one or more sensitive applications.

20 Claims, 5 Drawing Sheets

(56) References Cited

U.S. PATENT DOCUMENTS

| | | | | |
|---|---|---|---|---|
| 2011/0179366 A1* | 7/2011 | Chae | G06F 21/84 | 715/764 |
| 2012/0079598 A1* | 3/2012 | Brock | G06F 21/577 | 726/25 |
| 2013/0103665 A1* | 4/2013 | Kasterstein | G06F 17/30864 | 707/706 |
| 2013/0145457 A1* | 6/2013 | Papakipos | G06F 21/6245 | 726/19 |
| 2014/0187213 A1* | 7/2014 | Shuster | H04W 4/023 | 455/414.1 |
| 2014/0215607 A1* | 7/2014 | Horne | G06F 21/6245 | 726/22 |
| 2014/0317710 A1* | 10/2014 | Sager | H04Q 9/00 | 726/7 |
| 2014/0325431 A1* | 10/2014 | Vranjes | G06F 3/0481 | 715/788 |
| 2015/0026608 A1* | 1/2015 | Wu | G06F 9/445 | 715/762 |
| 2016/0085385 A1* | 3/2016 | Gao | G06Q 10/109 | 715/814 |

OTHER PUBLICATIONS

"EverythingMe Launcher", Jun. 9, 2015, © 2015 Google, pp. 1-3, <https://play.google.com/store/apps/details?id=me.everything.launcher>.

"[Lounge] [Poll]—Sorting home screen's most commonly used apps", MIUI, Dec. 26, 2012, pp. 1-7, <http://en.miui.com/thread-1511-1-1.html>.

\* cited by examiner

DYNAMIC APPLICATION HIDING

BACKGROUND OF THE INVENTION

The present invention relates generally to the field of computing device security, and more particularly to security-enhanced user interfaces for computing devices.

Computing devices, particularly mobile devices, have become pervasive tools for everyday communication and transactions, and they are commonly used for these purposes in both private and public environments. For these reasons, mobile devices and the applications that they run are vulnerable to access and use by unauthorized individuals as a result of loss, theft, or casual sharing, and this can have harmful consequences for device owners.

SUMMARY

According to one embodiment of the present invention, a method for dynamic application hiding is provided. A computing device repeatedly detects environmental cues in a vicinity of the computing device. The computing device determines the presence of a threat based on matching at least one of the detected environmental cues with one or more stored threat criteria. The computing device determines the presence of one or more sensitive applications on a user interface. The computing device, responsive to determining the presence of the threat, hides the one or more sensitive applications.

According to another embodiment of the present invention, a computer program product is provided. The computer program product can include one or more computer readable storage media and program instructions stored on the one or more computer readable storage media, the program instructions comprising: program instructions to detect, repeatedly, environmental cues in a vicinity of a computing device; program instructions to determine the presence of a threat based on matching at least one of the detected environmental cues with one or more stored threat criteria; program instructions to determine the presence of one or more sensitive applications on a user interface; and program instructions to hide, responsive to determining the presence of the threat, the one or more sensitive applications.

According to another embodiment of the present invention, a computer system is provided. The computer system can include one or more user interfaces; one or more input devices; one or more processors; one or more computer readable storage media; and program instructions stored on the one or more computer readable storage media for execution by at least one of the one or more processors, the program instructions comprising: program instructions to detect, repeatedly, environmental cues in a vicinity of a computing device; program instructions to determine the presence of a threat based on matching at least one of the detected environmental cues with one or more stored threat criteria; program instructions to determine the presence of one or more sensitive applications on a user interface; and program instructions to hide, responsive to determining the presence of the threat, the one or more sensitive applications.

DETAILED DESCRIPTION

Embodiments described herein respond to the challenges of preventing access to and use of applications on a computing device by unauthorized persons when the device is lost, stolen, or otherwise leaves the control of its authorized user(s), and display of personal information to unauthorized persons when using the device in public. Existing security measures such as password protection of the device can prove inadequate if, for example, a thief has correctly guessed the password and gained access to the device. Even if an application is also password-protected, merely being aware of the application's presence brings the unauthorized party one step closer to finding a way to access and misuse it. By making applications invisible in response to environmental cues, the present invention can leave unauthorized parties unaware of the applications' presence and less likely to seek and, ultimately, gain, access to those applications.

Figure 1:
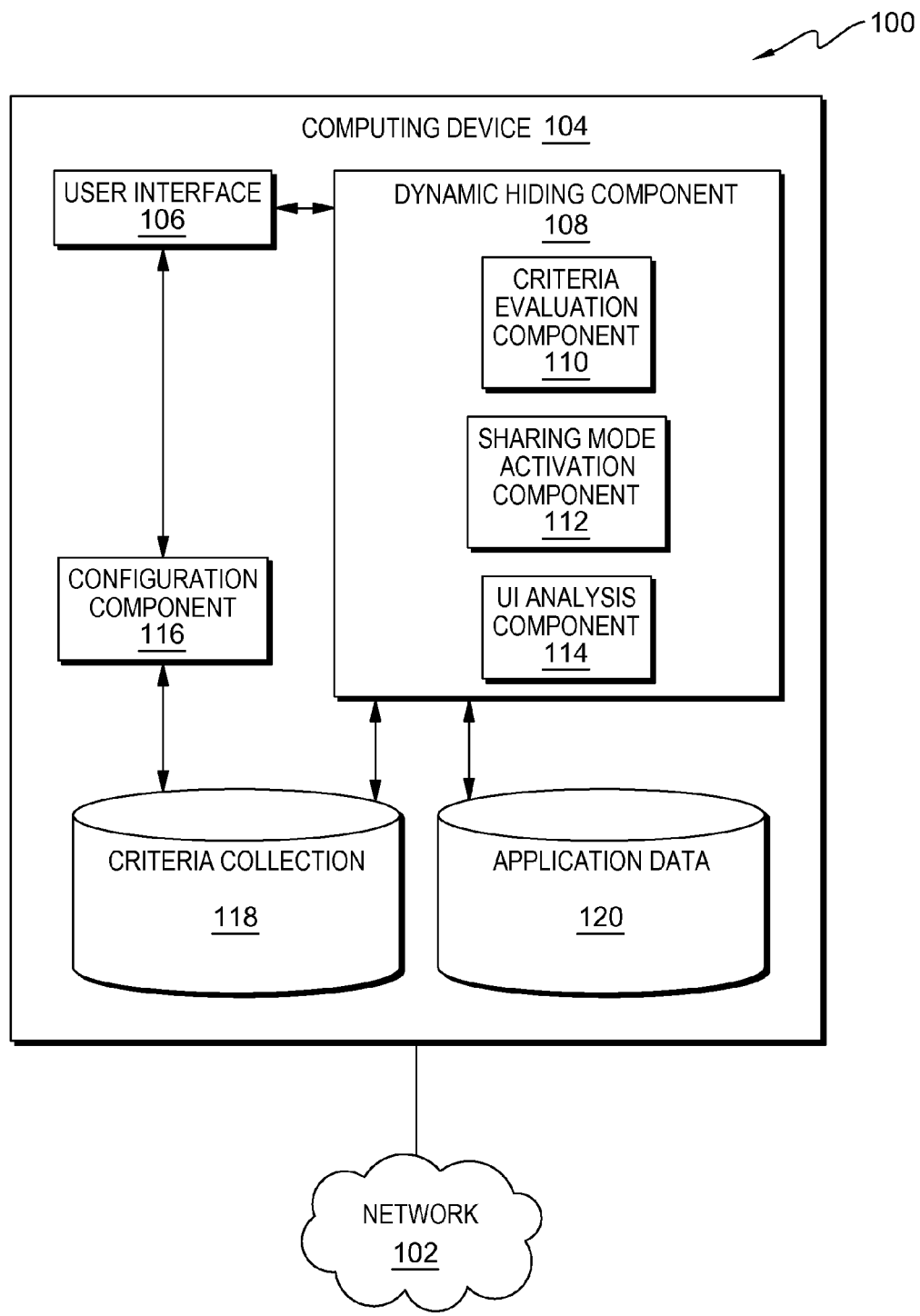
FIG. 1 is a functional block diagram of an exemplary computing environment, in accordance with an embodiment of the present invention.

FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 includes computing device 104, which can be interconnected with other devices (not shown) over network 102. Network 102 can be, for example, a telecommunications network, a local area network (LAN), a wide area network (WAN), such as the Internet, or a combination of these, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104 and other computing devices (not shown) within computing environment 100.

Computing device 104 can be a mobile device such as but not limited to a smartphone or tablet computer, or computing device 104 can be any programmable electronic device capable of executing machine-readable instructions and communicating with other devices over network 102. Computing device 104 includes user interface 106, dynamic hiding component 108, configuration component 116, criteria collection 118, and application data 120. Computing device 104 can include internal and external hardware components, as depicted and described in further detail with respect to FIG. 5.

User interface 106 provides an interface between a user of computing device 104 and computing device 104. User interface 106 can be, but is not limited to being, a graphical user interface (GUI) or a web user interface (WUI) and can display text, documents, web browser windows, user options, application interfaces, and instructions for operation, and can include the information (such as graphic, text, and sound) presented to a user and the control sequences the user employs to control dynamic hiding component 108 and configuration component 116, as described herein.

Dynamic hiding component 108 includes criteria evaluation component 110, sharing mode activation component 112, and user interface (UI) analysis component 114. Dynamic hiding component 108 performs steps of a dynamic application hiding method, as described herein with reference to FIG. 2.

Figure 2:
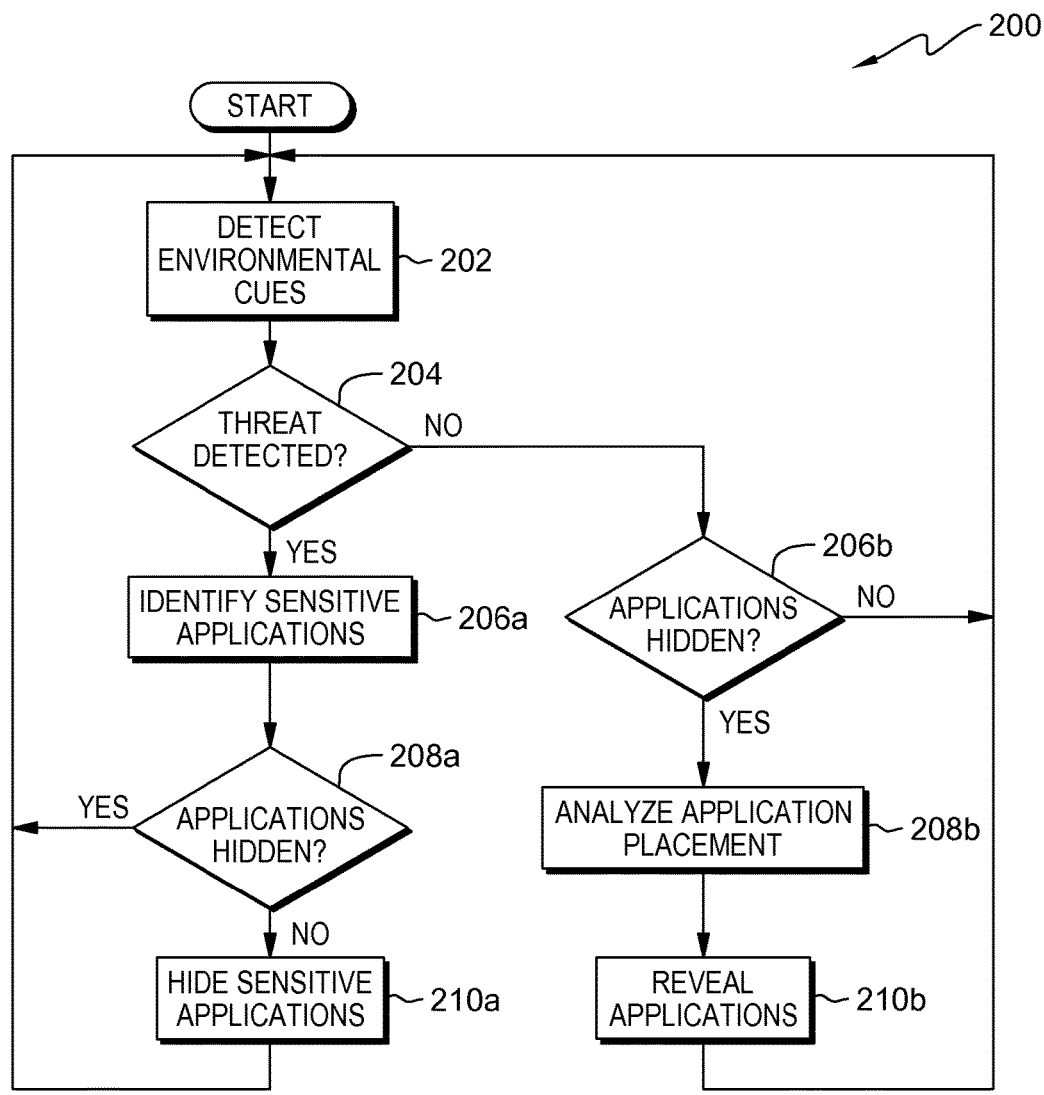
FIG. 2 is a flowchart depicting operational steps of a dynamic hiding method, in accordance with an embodiment of the present invention.

Criteria evaluation component 110 can trigger "Threat" mode, as described herein with reference to FIG. 2. In an exemplary embodiment, criteria evaluation component 110 does this by checking environmental cues detected by dynamic hiding component 108 against threat criteria in criteria collection 118 (described below). For example, criteria evaluation component 110 can compare location information to a list of addresses of user-designated safe zones and unsafe zones stored in criteria collection 118 and check for matches.

Sharing mode activation component 112 can trigger "Threat" mode in response to a user input, as described herein with reference to FIG. 2. For example, sharing mode activation component can trigger "Threat" mode in response to an input from a user planning to share computing device 104 with a third party, albeit in the absence of other threats.

UI analysis component 114 removes applications from user interface 106 in "Threat" mode and organizes and redisplays hidden applications in "Safe" mode, as described herein with reference to FIG. 2. Methods for dynamically generating and displaying a user interface are well known in the prior art.

Figure 3:
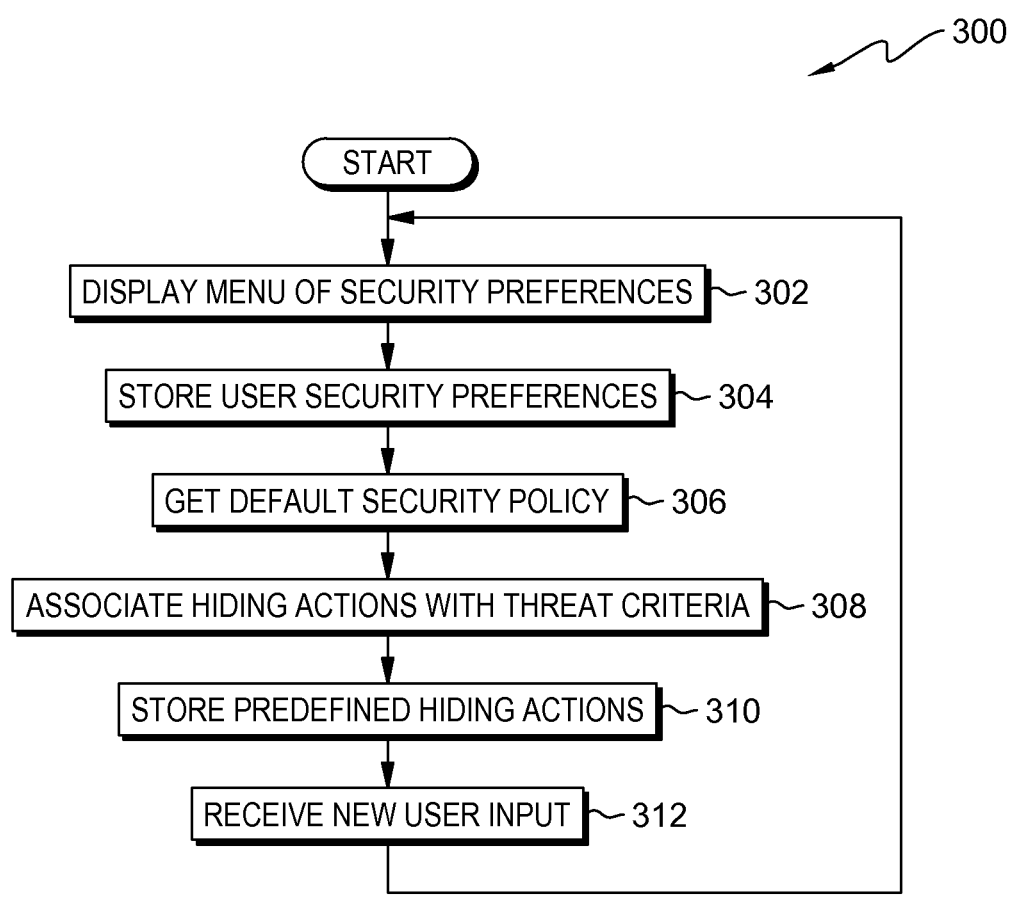
FIG. 3 is a flowchart depicting operational steps of a rulemaking method, in accordance with an embodiment of the present invention.

Configuration component 116 performs steps of a rule-making method, as described herein with reference to FIG. 3.

Criteria collection 118 includes information such as, but not limited to, information defining certain locations, times of day, and other environmental factors as security threats (also referred to herein as "threats" and "threat criteria"); defining the threat level associated with individual applications or types of applications; defining the hiding action(s) taken by dynamic hiding component 108 in "Threat" mode; and capturing user preferences. A security threat is defined as a condition or combination of conditions that, when met, triggers the transition of user interface 106 to "Threat" mode. The threat level associated with an application can be, for example, "low," "medium," or "high," and depends on the nature of the information the application contains. In an exemplary embodiment, a news application can have a low threat level, a social application can have a medium threat level, and a financial application can have a high threat level. User preferences (also referred to herein as "security preferences") are defined as user inputs that override a default configuration of dynamic hiding component 108, for example, designating a specific address within a high-crime neighborhood as a "safe zone," designating a specific address an "unsafe zone" (e.g., a bar where the user expects to behave carelessly), designating the presence of other devices (and device users) a threat, or marking a low-threat application as high-threat based on the personal information that it stores. A user can define a security preference with respect to a specific application by, for example, making selections on a menu when he or she first installs the application on computing device 104.

Application data 120 includes, but is not limited to including, screen data and an application icon displayed on user interface 106, and installation data associated with an application installed on computing device 104, and other information stored on computing device 104 by the application.

FIG. 2 is a flowchart 200 depicting an example of operational steps of a dynamic hiding method performed by dynamic hiding component 108 in accordance with an embodiment of the present invention. In step 202, dynamic hiding component 108 detects environmental cues in the vicinity of computing device 104. Environmental cues in the vicinity of computing device 104 are defined as information received by computing device 104 concerning its surroundings within a predefined radius (e.g., 1 mile) and can include, but are not limited to including, location data, historical crime rates, the number of devices nearby, whether or not computing device 104 is connected to a secure wireless network, and keywords in messages sent or posted by the user on social networks.

In step 204, criteria evaluation component 110 determines whether or not a threat is present based on matching the environmental cues with threat criteria in criteria collection 118. If criteria evaluation component 110 determines that a threat is present in step 204 (triggering "Threat" mode), then in step 206a, criteria evaluation component 110 identifies any sensitive (e.g., characterized by a medium or high threat level) applications present on computing device 104.

In another embodiment, the detected threat can instead be a user input controlling sharing mode activation component 112 in order to trigger "Threat" mode manually. If sharing mode activation component 112 triggers "Threat" mode in step 204, then in step 206a, criteria evaluation component 110 identifies any sensitive applications present on computing device 104.

In step 208a, for each of the sensitive applications identified in step 206a, UI analysis component 114 determines whether the application is hidden from user interface 106. In step 210a, UI analysis component 114 hides application data 120 associated with the applications identified in step 206a and determined not to be hidden (i.e., determined to be present on user interface 106) in step 208a. UI analysis component 114 can, for example, remove screen data and the application icon associated with the application from user interface 106, as illustrated herein in FIG. 4B. When hiding applications in step 208a, UI analysis component 114 can also rearrange the application icons remaining on user interface 106 in order to fill resulting empty spaces. If UI analysis component 114 determines that an application is already hidden in step 208a, then UI analysis component 114 does not proceed to step 210a.

In another exemplary embodiment, dynamic hiding component 108 can uninstall a sensitive application and clear associated data from the cache of computing device 104 in "Threat" mode. Criteria collection 118 defines which specific hiding action(s) dynamic hiding component 108 takes in "Threat" mode. Criteria collection 118 can be customized and updated according to the rulemaking method described herein with reference to FIG. 3.

If, in step 204, criteria evaluation component 110 determines that no threat is present (triggering "Safe" mode), then in step 206b, UI analysis component 114 determines which applications present on computing device 104 are hidden. In step 208b, UI analysis component 114 determines where the hidden applications should appear on user interface 106. For example, UI analysis component 114 can determine that more frequently used hidden applications should be redisplayed on the home screen of user interface 106, and less frequently used non-hidden applications should be relegated to a secondary screen of user interface 106. In step 210b, UI analysis component 114 redisplays the hidden applications on user interface 106. If UI analysis component 114 determines that an application is not hidden in step 206b, then UI analysis component 114 does not proceed to step 208b with respect to that application.

In another exemplary embodiment, in step 204, criteria evaluation component 110 can trigger "Safe" mode in response to a user input. For example, criteria evaluation component 110 can trigger "Safe" mode in response to receiving a higher level of authentication, such as but not limited to an additional password. If criteria evaluation component 110 triggers "Safe" mode in step 204, then in step 206b, UI analysis component 114 determines which applications present on computing device 104 are hidden. In step 208b, UI analysis component 114 determines where the hidden applications should appear on user interface 106. In step 210b, UI analysis component 114 redisplays the hidden applications on user interface 106. If UI analysis component 114 determines that an application is not hidden in step 206b, then UI analysis component 114 does not proceed to step 208b with respect to that application.

Dynamic hiding component 108 repeats steps 202-210 until the user terminates the dynamic application hiding method by, for example, turning off computing device 104.

FIG. 3 is a flowchart 300 depicting an example of operational steps of a rulemaking method performed by configuration component 116 in accordance with an embodiment of the present invention. Configuration component 116 can initiate the rulemaking method when, for example, an application is installed on computing device 104. In step 302, configuration component 116 displays a menu of customizable security preferences on user interface 106. Security preferences can include, for example, the hiding action(s) to be taken by dynamic hiding component 108 in "Threat" mode (e.g., hide screen data, clear cache, uninstall) with respect to an application based on the threat level of the application. In step 304, configuration component 116 stores the security preferences indicated by the user in step 302.

In step 306, configuration component 116 accesses the default security preferences for computing device 104 stored in criteria collection 118. In step 308, configuration component 116 associates one or more hiding actions with one or more security threats and one or more security threat levels, based on the security preferences indicated by the user in step 302 and the default security preferences accessed by configuration component 116 in step 306. In step 310, configuration component 116 stores the hiding action(s) defined in step 308 in criteria collection 118.

In step 312, configuration component 116 receives new user input initiating an update of criteria collection 118 and repeats steps 302-312.

Figure 4A:
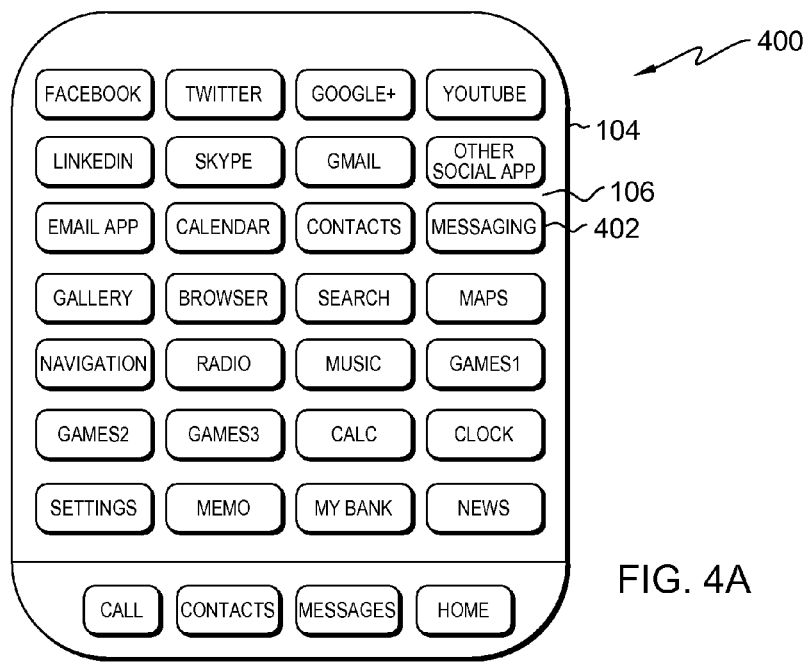
FIG. 4A-B are diagrams showing exemplary views of a user interface displaying applications in "Safe" mode and a user interface displaying applications in "Threat" mode, respectively, in accordance with an embodiment of the present invention.

FIG. 4A shows an exemplary view 400 of user interface 106 of computing device 104 displaying application 402 in "Safe" mode, in accordance with an embodiment of the present invention. In this example, computing device 104 can be in use in a user-designated safe zone, and application 402 can be a messaging application with a medium threat level.

Figure 4B:
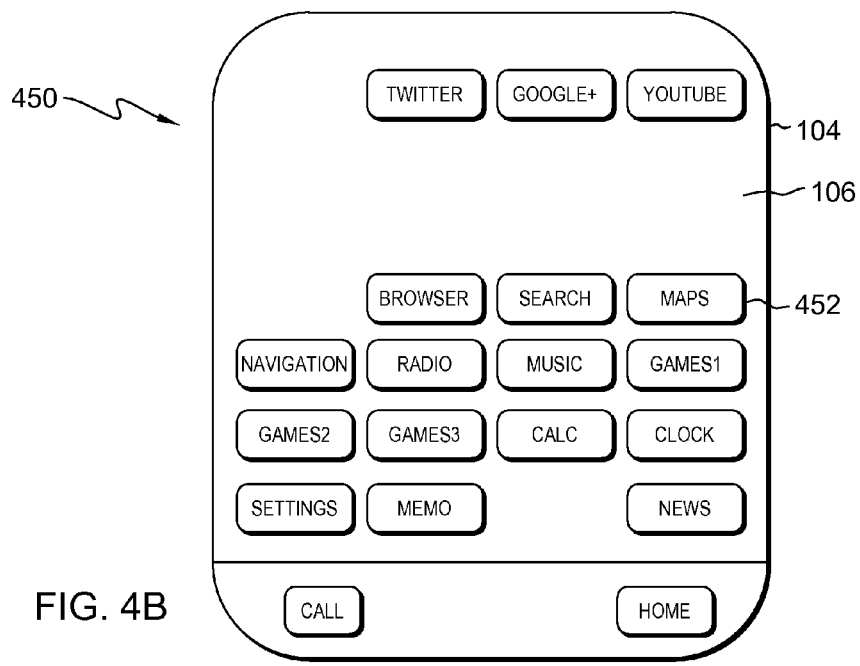

FIG. 4B shows an exemplary view 450 of user interface 106 of computing device 104 in "Threat" mode, in accordance with an embodiment of the present invention. In this example, application 402 (not shown) is hidden from user interface 106 in response to a security threat. For example, data indicating that computing device 104 is in use on a train in the presence of many other devices (and therefore many other device users) can be security threats triggering "Threat" mode. Application 452 can be, for example, a maps application with a low threat level. In this example, criteria evaluation component 110 (not shown) has not determined that application 452 is a sensitive application and UI analysis component 114 (not shown) has not hidden application 452 from user interface 106.

Figure 5:
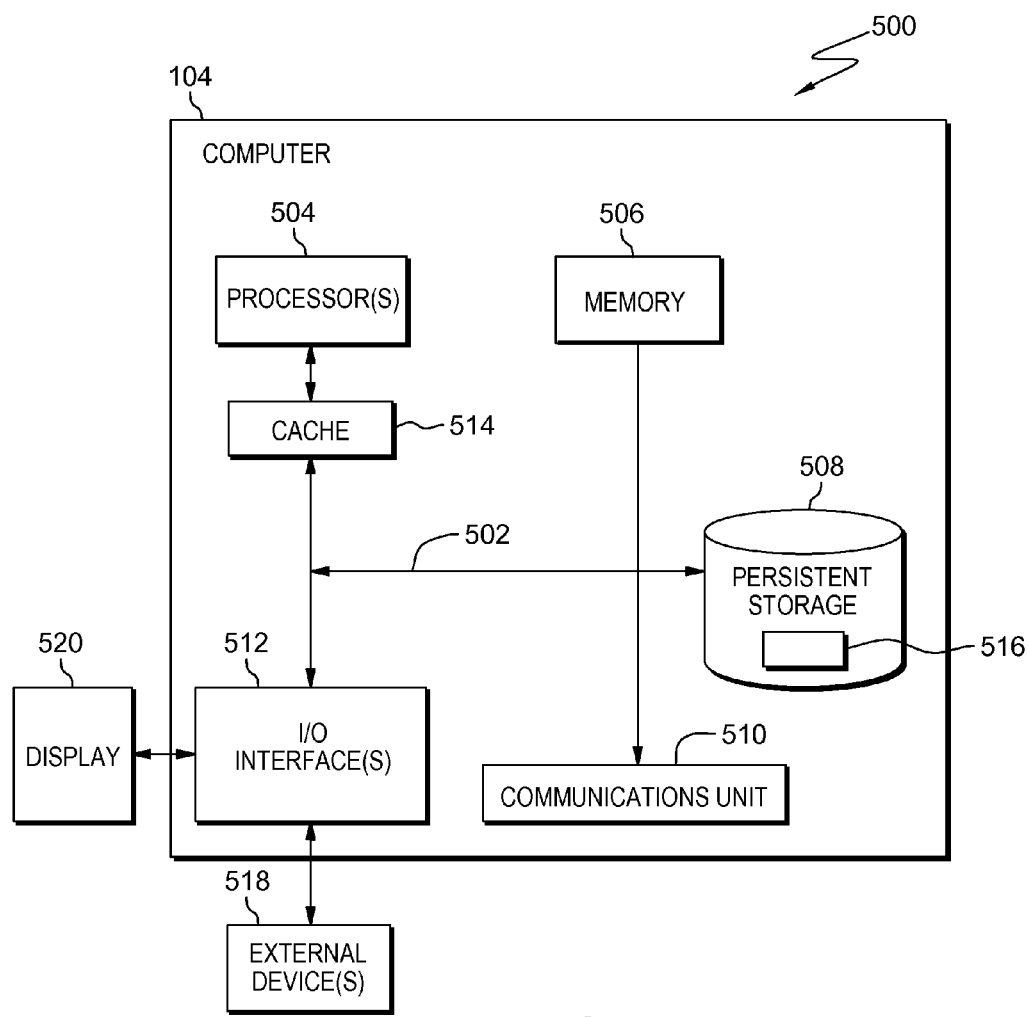
FIG. 5 is a block diagram of components of the computing device in FIG. 1, in accordance with an embodiment of the present invention.

FIG. 5 depicts a block diagram 500 of components of computing device 104 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 104 includes communications fabric 502, which provides communications between computer processor(s) 504, memory 506, persistent storage 508, communications unit 510, and input/output (I/O) interface(s) 512, and cache 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) and cache memory 514. In general, memory 506 can include any suitable volatile or non-volatile computer readable storage media. Cache 514 is a fast memory that enhances the performance of computer processor(s) 504 by holding recently accessed data, and data near accessed data, from memory 506.

In the interest of simplicity, dynamic hiding component 108, criteria evaluation component 110, sharing mode activation component 112, UI analysis component 114, configuration component 116, criteria collection 118, and application data 120 are collectively referred to herein as component(s) 516. Component(s) 516 is stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. Communications unit 510 can include one or more network interface cards. Communications unit 510 can provide communications through the use of either or both physical and wireless communications links. Component(s) 516 can be downloaded to persistent storage 508 through communications unit 510.

I/O interface(s) 512 allows for input and output of data with other devices that may be connected to computing device 104. For example, I/O interface 512 can provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., component(s) 516, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamic application hiding, the computer-implemented method comprising:
    detecting, repeatedly, by one or more processors, environmental cues in a vicinity of a computing device wherein the environmental dues comprise a location of the computing device, historical crime rates associated with the location, number of devices at the location, security level of a network communicatively connected to the computing device and keywords sent by the device towards social media;
    determining, by one or more processors, a presence of a threat based on matching at least one of the detected environmental cues with one or more stored threat criteria;
    determining, by one or more processors, a presence of one or more sensitive applications on a user interface; and
    hiding, responsive to determining the presence of the threat, by one or more processors, the one or more sensitive applications based on removing icons associated with the one or more sensitive applications from the user interface and rearranging remaining icons on the user interface to fill empty space resulting from sensitive icon removal.

2. The computer-implemented method of claim 1, wherein the matched environmental cue is a predefined user input.

3. The computer-implemented method of claim 1, wherein the one or more sensitive applications comprise applications characterized by a medium threat level or a high threat level.

4. The computer-implemented method of claim 1, wherein hiding comprises taking one or more actions based on a customizable criteria collection.

5. The computer-implemented method of claim 1, wherein hiding comprises removing visual representations of the one or more sensitive applications from the user interface.

6. The computer-implemented method of claim 1, wherein hiding comprises clearing, from a cache of the computing device, data associated with the one or more sensitive applications.

7. The computer-implemented method of claim 1, wherein hiding comprises uninstalling the one or more sensitive applications from the computing device.

8. The computer-implemented method of claim 1, further comprising:
    detecting, by one or more processors, that the threat is no longer present based on no longer matching any of the detected environmental cues with any of the stored threat criteria and redisplaying, by one or more processors, the one or more sensitive applications on the user interface.

9. A computer program product for dynamic application hiding, the computer program product comprising:
    one or more non-transitory computer readable storage media and program instructions stored on the one or more non-transitory computer readable storage media, the program instructions comprising:
    program instructions to detect, repeatedly, environmental cues in a vicinity of a computing device wherein the environmental cues comprise a location of the computing device, historical crime rates associated with the location, number of devices at the location, security level of a network communicatively connected to the computing device and keywords sent by the device towards social media;
    program instructions to determine a presence of a threat based on matching at least one of the detected environmental cues with one or more stored threat criteria;
    program instructions to determine a presence of one or more sensitive applications on a user interface; and
    program instructions to hide, responsive to determining the presence of the threat, the one or more sensitive applications based on removing icons associated with the one or more sensitive applications from the user interface and rearranging remaining icons on the user interface to fill empty space resulting from sensitive icon removal.

10. The computer program product of claim 9, wherein the matched environmental cue is a predefined user input.

11. The computer program product of claim 9, wherein hiding comprises removing visual representations of the one or more sensitive applications from the user interface.

12. The computer program product of claim 9, wherein hiding comprises clearing, from a cache of the computing device, data associated with the one or more sensitive applications.

13. The computer program product of claim 9, wherein hiding comprises uninstalling the one or more sensitive applications from the computing device.

14. The computer program product of claim 9, further comprising:
    program instructions to detect that the threat is no longer present based on no longer matching any of the detected environmental cues with any of the stored threat and redisplay the one or more sensitive applications on the user interface.

15. A computer system comprising:
    one or more user interfaces;

one or more input devices;
one or more processors;
one or more computer readable storage media; and
program instructions stored on the one or more computer readable storage media for execution by at least one of the one or more processors, the program instructions comprising:
  program instructions to detect, repeatedly, environmental cues in a vicinity of a computing device wherein the environmental cues comprise a location of the computing device, historical crime rates associated with the location, number of devices at the location, security level of a network communicatively connected to the computing device and keywords sent by the device towards social media;
  program instructions to determine a presence of a threat based on matching at least one of the detected environmental cues with one or more stored threat criteria;
  program instructions to determine a presence of one or more sensitive applications on a user interface; and
  program instructions to hide, responsive to determining the presence of the threat, the one or more sensitive applications based on removing icons associated with the one or more sensitive applications from the user interface and rearranging remaining icons on the user interface to fill empty space resulting from sensitive icon removal.

16. The computer system of claim 15, wherein the matched environmental cue is a predefined user input.

17. The computer system of claim 15, wherein hiding comprises removing visual representations of the one or more sensitive applications from the user interface.

18. The computer system of claim 15, wherein hiding comprises clearing, from a cache of the computing device, data associated with the one or more sensitive applications.

19. The computer system of claim 15, wherein hiding comprises uninstalling the one or more sensitive applications from the computing device.

20. The computer system of claim 15, further comprising:
  program instructions to detect that the threat is no longer present based on no longer matching any of the detected environmental cues with any of the stored threat criteria and redisplay the one or more sensitive applications on the user interface.

* * * * *